(12) United States Patent
Alexeenko et al.

(10) Patent No.: US 11,719,261 B2
(45) Date of Patent: Aug. 8, 2023

(54) VAPOR-PRESSURE DRIVEN PUMP

(71) Applicant: Purdue Research Foundation, West Lafayette, IN (US)

(72) Inventors: Alina Alexeenko, West Lafayette, IN (US); Katherine L Fowee, West Lafayette, IN (US); Steven M Pugia, Granger, IN (US); Steven Collicott, West Lafayette, IN (US); Anthony Cofer, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 485 days.

(21) Appl. No.: 16/593,066

(22) Filed: Oct. 4, 2019

(65) Prior Publication Data
US 2020/0109722 A1  Apr. 9, 2020

Related U.S. Application Data

(60) Provisional application No. 62/741,303, filed on Oct. 4, 2018.

(51) Int. Cl.
  *F04F 1/04*  (2006.01)
  *F04B 19/24*  (2006.01)
  *B64G 1/40*  (2006.01)

(52) U.S. Cl.
  CPC .............. *F04F 1/04* (2013.01); *B64G 1/402* (2013.01); *F04B 19/24* (2013.01)

(58) Field of Classification Search
  CPC ..... F04F 1/04; F04F 1/02; F04B 19/24; F04B 19/006; B64G 1/402; B64G 1/401; F02K 9/00
  See application file for complete search history.

(56) References Cited

U.S. PATENT DOCUMENTS

| | | | | |
|---|---|---|---|---|
| 5,823,478 A | * | 10/1998 | Dunn | B64G 1/402 244/171.1 |
| 11,021,273 B1 | * | 6/2021 | Wu | B64G 1/401 |
| 2006/0045766 A1 | * | 3/2006 | Harttig | F04B 19/006 417/412 |
| 2017/0159847 A1 | | 6/2017 | Alexeenko | |
| 2017/0191471 A1 | * | 7/2017 | Berg | F03H 1/0012 |

* cited by examiner

*Primary Examiner* — Bryan M Lettman
(74) *Attorney, Agent, or Firm* — Purdue Research Foundation

(57) ABSTRACT

A vapor-pressure driven micro pump system comprising an enclosure of a supporting structure; a first chamber having a first volatile material as a propellant with a plurality of exit nozzles; a second chamber have a second volatile material inside of a collapsible diaphragm which separates the first and the second chambers within said enclosure, wherein a vacuum at the plurality of exit nozzles causes vaporization of said propellant, which is compensated and displaced by vapor of said second volatile material at a substantially constant pressure by moving of said collapsible diaphragm. The vapor-pressure driven pump system is useful for various situations, especially in a gravity-free environment in space exploration.

20 Claims, 3 Drawing Sheets ary Patent Application No. 62/741,303, filed Oct. 4,
VAPOR-PRESSURE DRIVEN PUMP

CROSS-REFERENCE TO RELATED APPLICATION

This application claims the priority benefit of U.S. Provisional Patent Application No. 62/741,303, filed Oct. 4, 2018, the contents of which is incorporated herein by reference in its entirety.

GOVERNMENT RIGHTS

This invention was made with government support under grant no. NSSC18M0047, awarded by the National Aeronautics and Space Administration (NASA). The government has certain rights in the invention.

FIELD OF THE INVENTION

This invention generally relates to a pump system, particularly to a vapor-pressure driven pump system useful for various situations, especially in a gravity-free environment in space exploration.

BACKGROUND AND BRIEF SUMMARY

This section introduces aspects that may help facilitate a better understanding of the disclosure. Accordingly, these statements are to be read in this light and are not to be understood as admissions about what is or is not prior art.

Microsatellites and nanosatellites have become increasingly prevalent, as they present a cost-effective solution for an increasing range of space mission architectures. They offer an opportunity for new missions, such as constellation flying and exploration that their larger counterparts cannot economically achieve. To attain their full potential, small satellites, such as CubeSats, require micropropulsion devices to deliver precise low-thrust impulse bits for scientific, commercial, and military space applications. Onboard micropropulsion would mobilize a satellite to allow for accurate attitude control and precise station keeping of spacecraft constellations. Due to strict mass, power, and volume constraints, microspacecraft present the most challenging requirements for propulsion systems. Several micropropulsion technologies are being developed with the potential for integration in CubeSat missions, including our recently disclosed technology entitled "Microelectronic Thermal Valve," United States Patent Application Publication No.: 2017/0159847, published on Jun. 8, 2017. This Film-Evaporation MEMS Tunable Array (FEMTA) system, a micro electromechanical system (MEMS), uses an innovative design of small thrusters that deliver bursts of water vapor to manoeuvre the spacecraft into different orbits. It uses pure water as the propellant since it is safe, green, easy to use and free from the risk of contaminating sensitive instruments by the backflow from plumes as in the case of thrusters using chemical propellants. IT uses capillaries thinner than human hair through which the propellant water can flow. Small heaters located near the ends of the capillaries turn the water into vapor, which on escaping provides the thrust.

The manipulation of liquid in space and other vacuum environments has been a challenge. Any advancement in this field would be a breakthrough that could lead to further discovery in spacecraft propulsion. We have developed a pump system by manipulating liquid fluids in low pressure, gravity-free environments. This technology is a gravity-free pump with a self-regulated, low head pressure that can be used as a propellant supply tank for micropropulsion systems operating in space or other vacuum environments. It has been tested in a vacuum chamber to replicate the nominal operating procedure. Major advantages and potential applications include: a) anipulates fluids in low pressure, gravity-free environments; b) self-regulated, low head pressure; c) micropropulsion systems; d) operable in space or other vacuum environment

BRIEF DESCRIPTION OF THE DRAWINGS

Embodiments of the present disclosure will now be described by way of example in greater detail with reference to the attached FIGS., in which.

DETAILED DESCRIPTION

Figure 1:
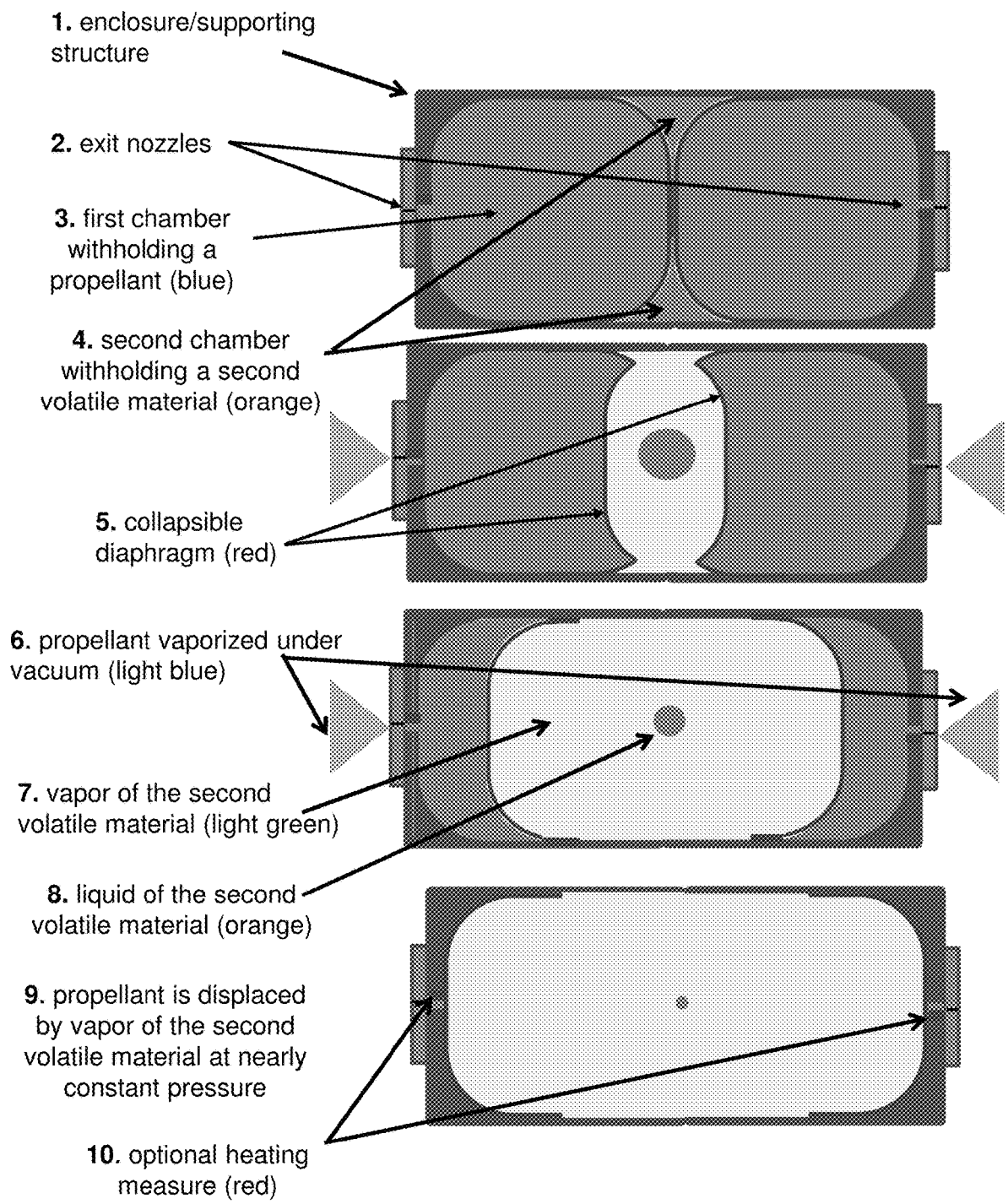
FIG. 1 depicts essential elements of the vapor-pressure driven pump system disclosed herein: (1) enclosure/supporting structure. Duplex thruster fully loaded at total liquid conditions for launch (top view); (2) exit nozzle for propellant; (3) first chamber withholding a propellant, the first volatile material; (4) second chamber withholding a second volatile material; (5) collapsible diaphragm that forms the second chamber. One quarter propellant used (second view); (6) propellant vaporized under vacuum; (7) and (8) vapor of the second volatile material and the leftover liquid material. Propellant is about third quarters depleted (third view); (9) propellant is displaced by vapor of the second volatile material at nearly constant pressure. Propellant is fully depleted (bottom view); (10) optional heating measure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range.

The invention is for a method of manipulating liquid fluids in low pressure, gravity-free environments using the vapor pressure of a secondary mixture of liquids as a pressurant source to motivate a diaphragm and a device designed based on this mechanism. The head pressure for the pump is equal to the vapor pressure of the liquid mixture and can be set by varying the proportions of contents of the mixture prior to operation. The gravity-free pump with a self-regulated, low head pressure can be used as a propellant supply tank for micropropulsion systems operating in space or other vacuum environment. Also methods for sizing, fabricating, and operating the pump are disclosed.

The ratio of specific volume between alcohol liquid and vapor phase is on the order of 1000 so this should be an ample supply to replace the volume of propellant. The thruster module would be loaded in a low-pressure environment with thoroughly degassed water and the nozzle sealed with a vacuum sublimating material such as naphthalene which should also protect against hydrostatic overpressure under high gee loading.

In some illustrative embodiments, the present invention relates to a vapor pressure driven pump system comprising
  a) an enclosure/supporting structure;
  b) a first chamber having a first volatile material;
  c) a second chamber having a second volatile material as a propellant, and a plurality of exit nozzles; and
  d) a flexible collapsible diaphragm separating and interconnecting the first and the second chambers, wherein a vacuum at the exit nozzle leads to vaporization of said propellant and displaced by vapor of said first volatile material at nearly constant pressure by moving of said collapsible diaphragm.

In some illustrative embodiments, the present invention relates to a vapor pressure driven pump system disclosed herein, the vapor pressure driven pump system further comprises a heating means operationally connected with said plurality of exit nozzles, wherein heating vaporizes and pushes said propellant out through said exit nozzles while vapor of said first volatile material expands and propels collapsible diaphragm to fill and compensate the space due to the loss of said propellant.

In some illustrative embodiments, the present invention relates to a vapor pressure driven pump system disclosed herein, wherein the pump system is operational under a gravity-free environment.

In some illustrative embodiments, the present invention relates to a vapor pressure driven pump system disclosed herein, wherein the pump system is operational in outside of atmospheric space.

In some illustrative embodiments, the present invention relates to a vapor pressure driven pump system disclosed herein, wherein the pump system is a micro pump system useful in the manipulation and operation of a satellite system in space exploration.

In some illustrative embodiments, the present invention relates to a vapor pressure driven pump system disclosed herein, wherein said first volatile material is water, ethanol, methanol, propanol, ether, ethylene glycol, or a mixture thereof.

In some illustrative embodiments, the present invention relates to a vapor pressure driven pump system disclosed herein, wherein said second volatile material (propellant) is water, ethanol, methanol, propanol, ether, ethylene glycol, or a mixture thereof.

In some illustrative embodiments, the present invention relates to a vapor pressure driven pump system disclosed herein, wherein said second volatile material (propellant) has a higher boiling point than the first volatile material providing the driving force of pump.

In some illustrative embodiments, the present invention relates to a vapor pressure driven pump system disclosed herein, wherein said first volatile material is ethanol and the second volatile material (propellant) is water.

In some illustrative embodiments, the present invention relates to a vapor pressure driven pump system disclosed herein, wherein said first volatile material is a mixture of two or more volatile liquids.

In some illustrative embodiments, the present invention relates to a vapor pressure driven pump system disclosed herein, wherein said second volatile material (propellant) is less volatile than the first volatile material providing the driving force of pump.

In some other illustrative embodiments, the present invention relates to a method of building a micro propelling system in a gravity free environment comprising the steps of
  a) setting up an enclosure of supporting structure;
  b) adding a first chamber inside of said enclosure having a first volatile material;
  c) adding a second chamber having a second volatile material as a propellant, and a plurality of exit nozzles; and
  d) building a flexible collapsible diaphragm separating and interconnecting the first and the second chambers within said enclosure, wherein a vacuum at the exit nozzle leads to vaporization of said propellant (second volatile material) and displaced by vapor of said first volatile material at nearly constant pressure by moving of said collapsible diaphragm.

In some other illustrative embodiments, the present invention relates to a method of building a micro propelling system for a gravity free environment as disclosed herein further comprising adding a heating means operationally connected with said plurality of exit nozzles, wherein heating vaporizes and pushes said propellant out through said exit nozzles while vapor of said first volatile material expands and propels collapsible diaphragm to fill and compensate the space due to the loss of said propellant.

In some other illustrative embodiments, the present invention relates to a method of building a micro propelling system for a gravity free environment as disclosed herein, wherein said micro propelling system is a micro pump system useful in the manipulation and operation of a satellite system in space exploration.

In some other illustrative embodiments, the present invention relates to a method of building a micro propelling system for a gravity free environment as disclosed herein, wherein said first volatile material is water, ethanol, methanol, propanol, ether, ethylene glycol, or a mixture thereof.

In some other illustrative embodiments, the present invention relates to a method of building a micro propelling system for a gravity free environment as disclosed herein, wherein said first volatile material is a mixture of two or more volatile liquids.

In some other illustrative embodiments, the present invention relates to a method of building a micro propelling system for a gravity free environment as disclosed herein, wherein said first volatile material is ethanol and the second volatile material (propellant) is water.

In some other illustrative embodiments, the present invention relates to a method of building a micro propelling system for a gravity free environment as disclosed herein, wherein said second volatile material (propellant) is water, ethanol, methanol, propanol, ether, ethylene glycol, or a mixture thereof.

In some other illustrative embodiments, the present invention relates to a method of building a micro propelling system for a gravity free environment as disclosed herein, wherein said second volatile material (propellant) has a higher boiling point than the first volatile material (providing the driving force of pump).

In some other illustrative embodiments, the present invention relates to a method of building a micro propelling system for a gravity free environment as disclosed herein, wherein said second volatile material is a mixture of two or more volatile liquids.

Gravity-Free Propellant Distribution

The mass and volume of the FEMTA system is determined by desired propellant mass and the storage tank to hold it. Internal tank pressure is very low, <6 kPa so that the propellant tank structure can be thin and lightweight. Inner material must be non-metallic to resist the corrosive properties of ultrapure de-ionized water in the presence of an electric field. Polyimide, PEEK, and PTFE are the preliminary materials of choice. 3D printable resins are also under consideration. The fuel tank membrane material will be either nylon or polyethylene teraphthalate. The space between membranes will contain a mixture of propanol and isopropanol in proportions so that the vapor pressure matches the desired feed pressure. The liquid alcohol would fill the interstitial space between membranes to provide an incompressible core for the tank during launch. As propellant is used the alcohol would vaporize as needed to fill the space left by the retreating membrane as visualized in FIGS. 1 and 2.

FIG. 1 depicts duplex FEMTA zero gravity feed system utilizing saturated alcohol vapor as a constant pressure source. propellant depleted (bottom right). essential elements of the vapor-pressure driven pump system disclosed herein: (1) enclosure/supporting structure for propellant, first chamber. Duplex thruster fully loaded at total liquid conditions for launch (top view); (2) exit nozzle for propellant; (4) second chamber holding a volatile material; (5) collapsible diaphragm. One quarter propellant used (second view); (6) propellant vaporized by vacuum; (7) and (8) vapor of the volatile material which provides the propelling force and the leftover liquid material. Propellant is about third quarters depleted (third view); (9) propellant is displaced by vapor of the second volatile material at nearly constant pressure. Propellant is fully depleted (bottom view).

Figure 2:
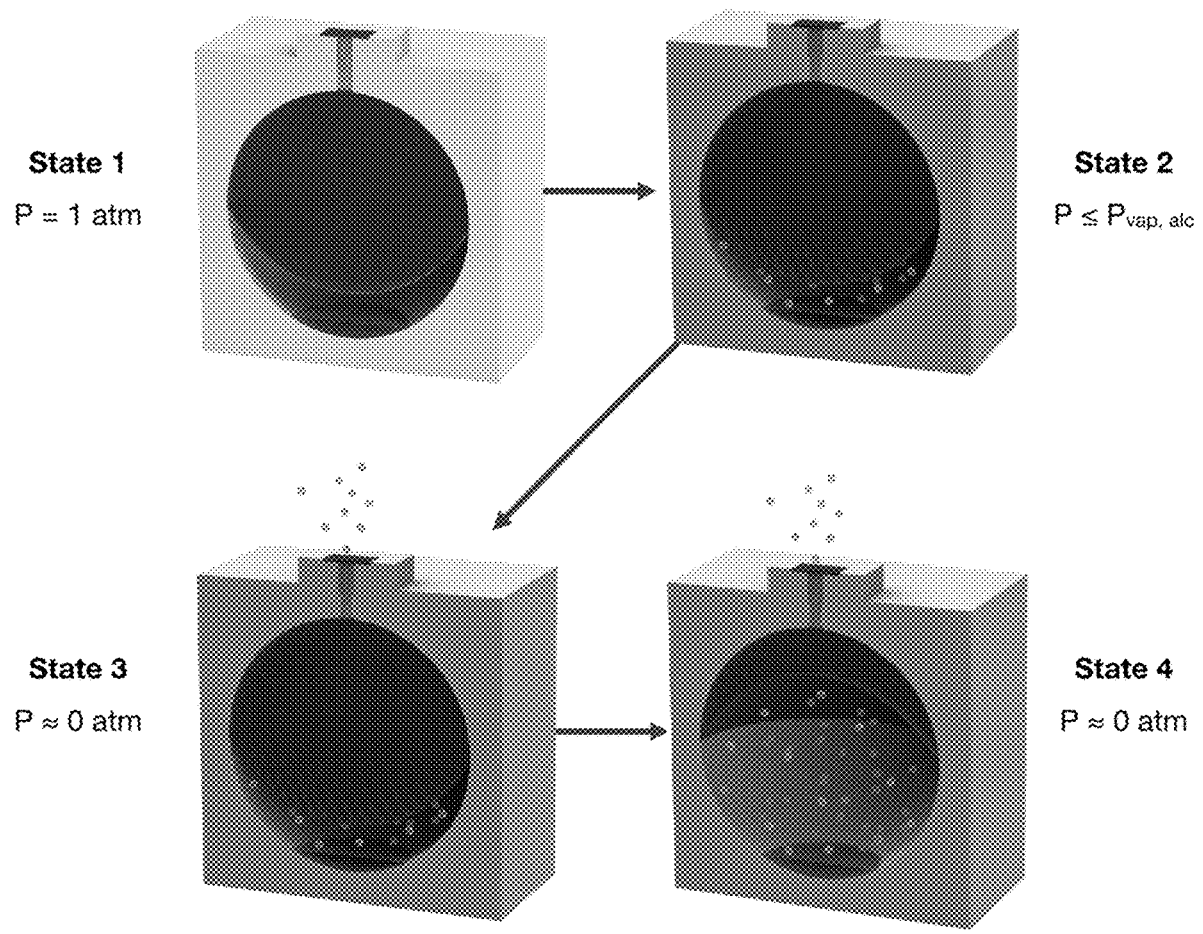
FIG. 2 shows an alternative view of the vapor-pressure driven pump system disclosed herein:
  a. State 1—Sea Level: The ambient pressure as well as the pressures within the motive and passive sides of the tanks are at 1 atm of pressure and FEMTA is not firing.
  b. State 2—Ascent: As the ambient pressure decreases, the pressure within the motive and passive sides of the propellant tank also decrease. Once the pressure on the motive side drops below the vapor pressure of the alcohol mixture, the alcohol will begin to vaporize. The venting process on the motive side will then be stopped by shutting a valve.
  c. State 3 & 4—In-space Operation: Once the ambient pressure reaches a state of high vacuum, FEMTA will begin operation. As FEMTA is fired, the mass of water within the passive side of the tank will decrease. The decreasing water volume and positive pressure force from the vaporizing alcohol will cause the diaphragm to expand upward. More alcohol will vaporize to backfill the expanding volume in the motive side of the tank thus providing constant feed pressure.

FIG. 2 shows an alternative view of the vapor-pressure driven pump system disclosed herein:
 a. State 1—Sea Level: The ambient pressure as well as the pressures within the motive and passive sides of the tanks are at 1 atm of pressure and FEMTA is not firing.
 b. State 2—Ascent: As the ambient pressure decreases, the pressure within the motive and passive sides of the propellant tank also decrease. Once the pressure on the motive side drops below the vapor pressure of the alcohol mixture, the alcohol will begin to vaporize. The venting process on the motive side will then be stopped by shutting a valve.
 c. State 3 & 4—In-space Operation: Once the ambient pressure reaches a state of high vacuum, FEMTA will begin operation. As FEMTA is fired, the mass of water within the passive side of the tank will decrease. The decreasing water volume and positive pressure force from the vaporizing alcohol will cause the diaphragm to expand upward. More alcohol will vaporize to backfill the expanding volume in the motive side of the tank thus providing constant feed pressure.

Figure 3:
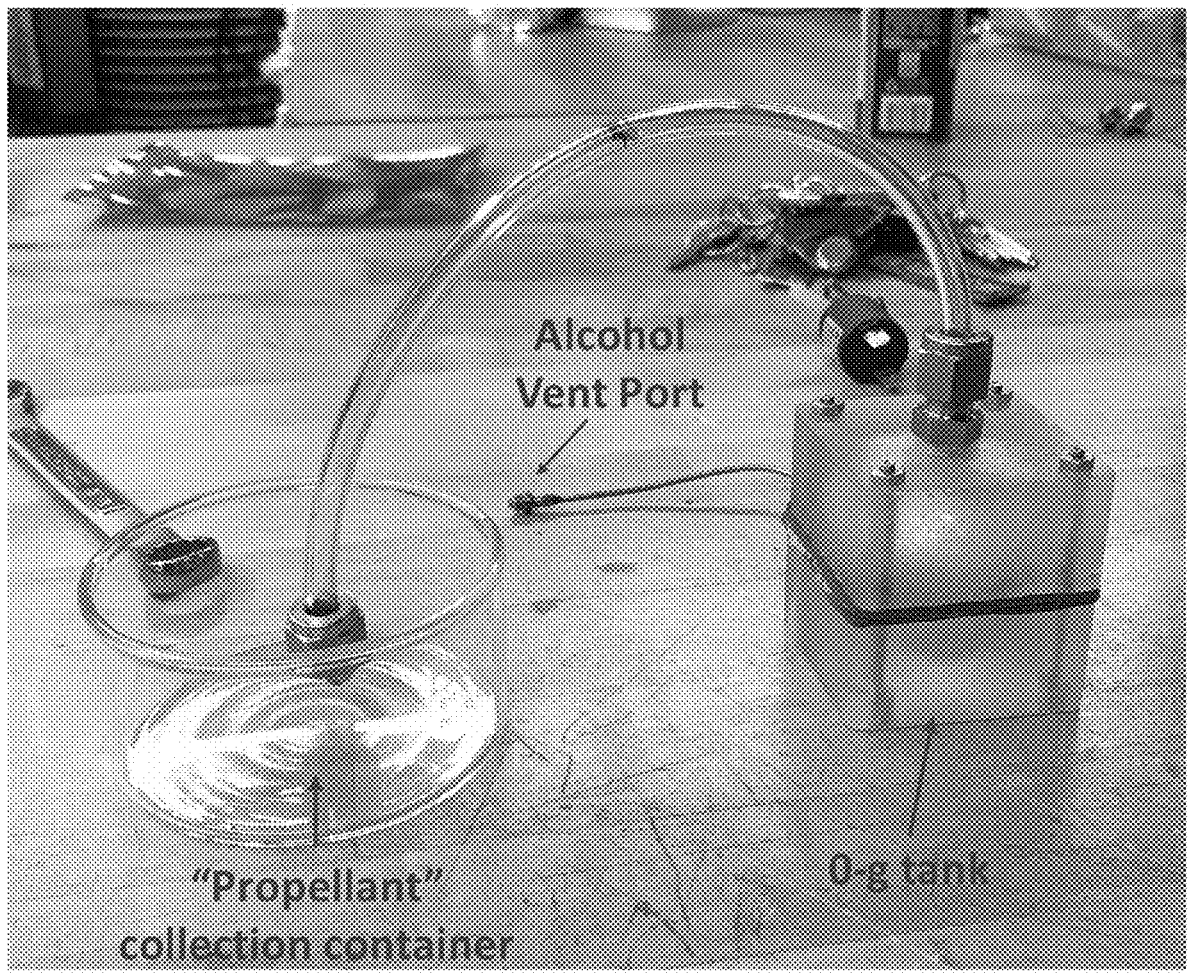
FIG. 3 shows a test article to prove the viability of the zero-g propellant tank design. Test Article is a 3D printed body with a polyethylene diaphragm, sealed with silicon and a solenoid valve for venting motive side of the tank. The Passive Fluid (propellant): Ethelyn glycol and the Motive Fluid (volatile liquid): Ethanol/Methanol mixture. We use a vacuum chamber to replicate the nominal operating procedure.

FIG. 3 shows a test article to prove the viability of the zero-g propellant tank design. Test Article is a 3D printed body with a polyethylene diaphragm, sealed with silicon and a solenoid valve for venting motive side of the tank. The Passive Fluid (propellant): Ethelyn glycol and the Motive Fluid (volatile liquid): Ethanol/Methanol mixture. We use a vacuum chamber to replicate the nominal operating procedure.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

We claim:

1. A vapor pressure driven pump system comprising
 a. an enclosure of a supporting structure, the enclosure constructed from a corrosion resistant material;
 b. a first chamber inside of said enclosure comprising two chambers on opposite ends of the enclosure and having a first volatile material as a propellant, and a plurality of exit nozzles, each exit nozzle corresponding to a chamber of the first chamber;
 c. a second chamber having a second volatile material located between the two chambers of the first chamber; and
 d. a flexible collapsible diaphragm separating the first and the second chambers while allowing a pressure equalization between the first and the second chambers within said enclosure, wherein a vacuum at the plurality of exit nozzles causes vaporization of said propellant, wherein the propellant is displaced and exhausted through the plurality of exit nozzles by vapor of said second volatile material at a substantially constant pressure via movement of said collapsible diaphragm caused by the vaporization of said second volatile material.

2. The vapor pressure driven pump system of claim 1 further comprising a heating measure operationally connected with said plurality of exit nozzles, wherein heating vaporizes and pushes said propellant out through said exit nozzles while vapor of said second volatile material evaporates and propels collapsible diaphragm to fill a space formed by the exhausting of said propellant.

3. The vapor pressure driven pump system of claim 1, wherein the pump system is operational under a gravity-free environment.

4. The vapor pressure driven pump system of claim 1, wherein the pump system is operational in outside of the atmospheric space.

5. The vapor pressure driven pump system of claim 1, wherein said first volatile material is water, ethanol, methanol, propanol, ether, ethylene glycol, or a mixture thereof.

6. The vapor pressure driven pump system of claim 1, wherein said second volatile material is water, ethanol, methanol, propanol, ether, ethylene glycol, or a mixture thereof.

7. The vapor pressure driven pump system of claim 1, wherein said second volatile material has a higher boiling point than the first volatile material.

8. The vapor pressure driven pump system of claim 1, wherein said first volatile material is ethanol and the second volatile material is water.

9. The vapor pressure driven pump system of claim 1, wherein said first volatile material is a mixture of two or more volatile liquids.

10. The vapor pressure driven pump system of claim 1, wherein said second volatile material is a mixture of two or more volatile liquids.

11. The method according to claim 1, wherein an internal pressure of the enclosure of the supporting structure is less than around six kilopascals.

12. The method according to claim 1, wherein the flexible collapsible diaphragm includes at least one of a nylon material and a polyethylene terephthalate material.

13. The method according to claim 1, wherein the enclosure is constructed from at least one of Polyimide, PEEK, and PTFE.

14. A method of a micro propelling system in a gravity free environment comprising
   a. an enclosure of a supporting structure, the enclosure constructed from a corrosion resistant material;
   b. a first chamber inside of said enclosure comprising two chambers on opposite ends of the enclosure and having a first volatile material as a propellant, and a plurality of exit nozzles, each exit nozzle corresponding to a chamber of the first chamber;
   c. a second chamber having a second volatile material located between the two chambers of the first chamber; and
   d. a flexible collapsible diaphragm separating the first and the second chambers while allowing a pressure equalization between the first and the second chambers within said enclosure, wherein a vacuum at the plurality of exit nozzles causes vaporization of said propellant (first volatile material), wherein the propellant is displaced and exhausted through the plurality of exit nozzles by vapor of said second volatile material at a substantially constant pressure via movement of said collapsible diaphragm caused by the vaporization of said second volatile material.

15. The method according to claim 14 further comprising a heating measure operationally connected with said plurality of exit nozzles, wherein heating vaporizes and pushes said propellant out through said exit nozzles while vapor of said second volatile material evaporates and propels collapsible diaphragm to fill and compensate the space due to the loss of said propellant.

16. The method according to claim 14, wherein said first volatile material is water, ethanol, methanol, propanol, ether, ethylene glycol, or a mixture thereof.

17. The method according to claim 14, wherein said first volatile material is a mixture of two or more volatile liquids.

18. The method according to claim 14, wherein said first volatile material is ethanol and the second volatile material is water.

19. The method according to claim 14, wherein said second volatile material is water, ethanol, methanol, propanol, ether, ethylene glycol, or a mixture thereof.

20. The method according to claim 14, wherein said second volatile material is a mixture of two or more volatile liquids.

* * * * *